Dec. 15, 1964  H. G. PAPACHARALAMBOUS  3,160,997
METHOD OF PRODUCING SPHERICAL PARTICLES
Filed May 31, 1960
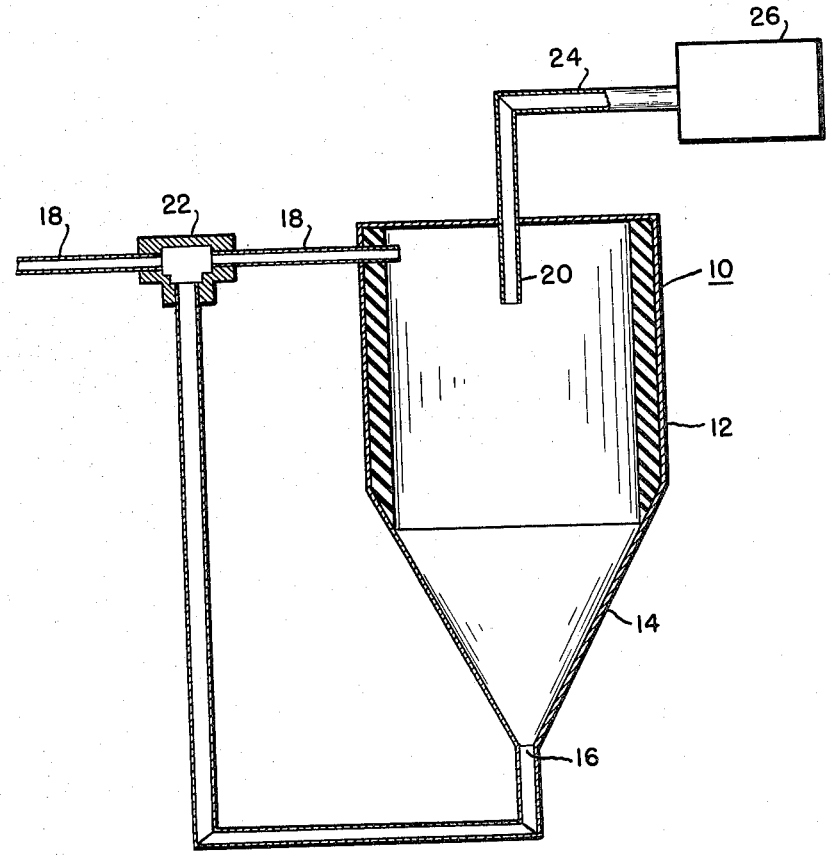
INVENTOR.
Harry G. Papacharalambous
BY
HIS ATTORNEY

United States Patent Office 3,160,997
Patented Dec. 15, 1964

3,160,997
METHOD OF PRODUCING SPHERICAL PARTICLES
Harry G. Papacharalambous, Tonawanda, N.Y., assignor to The Carborundum Company, Niagara Falls, N.Y., a corporation of Delaware
Filed May 31, 1960, Ser. No. 32,639
3 Claims. (Cl. 51—281)

This invention relates to a method of producing spherical particles, more particularly, to a method of producing rounded abrasive particles in the 40 to 60 micron range.

In forming fused metal bodies which incorporate boron carbide particles undesirable stringering or breakdown of the particles may occur when they have conventional irregular contours. To avoid this undesirable effect and obtain a finished shape having a uniform structure, rounded particles of boron carbide must be used. While the foregoing illustrates the need for spherical particles, there is no known method whereby such particles can be satisfactorily made. Pan mills, impact-type crushers, ball and rod mills, fluid energy mills and other conventional means for milling grain have been used, but none has been successful, particularly when very fine particles must be rounded.

My invention provides a method whereby such materials can readily be produced. I have found that by passing the angular particles through a cyclone with its apex in a closed circuit with injected air, the rough edges are broken off and a rounded product is obtained.

Cyclones have been widely used as a means for separating solids and liquids from gases and solids from liquids. They are the least expensive means of dust or mist collection both from an operational and an investment viewpoint. I have found that they also may be successfully utilized in the production of fine spherical particles by the attrition of angular particles to rounded particles.

In the drawing, I have shown diagrammatically an apparatus adapted to carry out my invention.

Referring to the drawing, a cyclone, designated generally at 10, is comprised of a straight section 12 and a conical section 14, converging to an apex 16. For use in my method, the cyclone may be made of steel but the straight section should be lined with rubber or some similar substance to prevent undue wear on the interior of the cyclone. A feed inlet 18 is located on the side of the cyclone adjacent the top thereof. A vortex finder 20 extends inwardly from the top of the cyclone to a point below the level of the feed inlet.

The apex 16 is connected in a closed circuit with injected air by means 22 such as a suction T. The vortex finder is connected to an exhaust 24 which leads to a dust collector 26.

In operation, a mixture of air and angular particles to be rounded is injected tangentially into the cyclone through the feed entry. Centrifugal force throws the particles out against the wall of the cyclone. As the particles descend toward the apex, they are rounded by attrition. The air and very fine particles broken off during the rounding operation are exhausted through the vortex finder to the dust collector. The partially rounded particles are drawn by means such as the suction T from the apex back into the feed inlet for recirculation and further rounding.

The following specific example will illustrate the operation of my method. A feed comprising two and one-half pounds of angular boron carbide particles ranging from 140 to 230 mesh was injected in air into a system like that shown in the drawing. The straight section of the cyclone was 12½" long and had an inside diameter of 7". The conical section was 15¾" in length and terminated in a 1¼₆" apex opening. The vortex finder was 1¼₆" in diameter and the feed entry was 1¼" in diameter. A 1" suction T was used to convey the solid material into the apex back into the inlet. The cyclone was operated at 15 p.s.i. for an hour. After the fines were removed from the product, the coarse fraction was recirculated in a similar system having a cyclone with a 5¾" straight section and a 4" inside diameter. The conical section of the cyclone was 9¾" in length terminating in a ¾" apex opening. A ½" suction T was used with this cyclone which was operated at a pressure of 20 p.s.i. for another hour. A product of 395 grams of perfectly rounded boron carbide particles having diameters in the 37 to 61 micron range was recovered.

Similar results were obtained with magnesium oxide particles. Using 16 mesh and finer feeds rounded magnesium oxide spheres 1000 microns and finer were produced.

This invention is equally applicable to the production of other types of rounded materials from the angular particles and is particularly useful in the production of rounded abrasive particles such as silicon carbide and aluminum oxide.

While I have described the invention in terms of a batch process, it should be recognized that it may be performed continuously. For this purpose, a plurality of cyclones may be arranged in series with the apex of each cyclone connected through means such as a suction T to the feed inlet of the next succeeding cyclone.

My invention may be embodied within the scope of the appended claims.

I claim:
1. A method of producing rounded particles from angular particles which comprises suspending angular particles in a stream of gas, passing said stream tangentially into a vessel having a circular cross section, whereby to impart a spiral motion to said stream during at least a part of which the average velocity of said stream is progressively increased while the angular velocity thereof is caused to constantly change thereby to cause said particles to impinge one upon another and to undergo mutual attrition, and separating said gas from said particles.
2. A method as set forth in claim 1 in which the fine products of mutual attrition are carried from said vessel by said gas.
3. A method as set forth in claim 1 in which said particles are recirculated through said vessel.

References Cited in the file of this patent
UNITED STATES PATENTS

| | | |
|---|---|---|
| 1,057,773 | Pratt | Apr. 1, 1913 |
| 1,647,249 | Podszus | Nov. 1, 1927 |
| 2,065,108 | Ulrich | Dec. 22, 1936 |
| 2,175,457 | Dunn | Oct. 10, 1939 |
| 2,572,262 | Hibbard | Oct. 23, 1951 |
| 2,734,317 | Bond | Feb. 14, 1956 |
| 2,735,421 | Cook | Feb. 21, 1956 |